United States Patent

[11] 3,617,088

| [72] | Inventor | Virgil E. Graham<br>Box 47, Hershey, Nebr. 69143 |
|---|---|---|
| [21] | Appl. No. | 6,139 |
| [22] | Filed | Jan. 27, 1970 |
| [45] | Patented | Nov. 2, 1971 |

[54] SUNVISOR EXTENDER
4 Claims, 6 Drawing Figs.

[52] U.S. Cl. .................................................. 296/97 C
[51] Int. Cl. ................................................... B60j 3/02
[50] Field of Search ...................................... 296/97 R, 97 B, 97 C

[56] References Cited
UNITED STATES PATENTS
2,629,626  2/1953  Ziler ............................ 296/97 C
3,208,792  9/1965  Martin .......................... 296/97 C FOREIGN PATENTS
1,402,144  5/1965  France ......................... 296/97 C Primary Examiner—Benjamin Hersh
Assistant Examiner—John A. Pekar
Attorney—Victor J. Evans & Co.

ABSTRACT: An extender for motor vehicle sunvisors which in one form of the invention has a form of a sleeve which encompasses the sunvisor and can be moved downwardly and sideways thereon to cover additional areas not normally covered by the sunvisor. In another form of the invention a metal clip attached to the sunvisor supports the extender which is positioned on one side of the sunvisor. Still another form of the invention has a metal clip secured to the extender with metal clip engaging the opposite side of the sunvisor from the extender.

PATENTED NOV 2 1971  3,617,088

INVENTOR.
VIRGIL E. GRAHAM
BY
Victor J. Evans & Co
ATTORNEYS.

SUNVISOR EXTENDER

BACKGROUND OF THE INVENTION

1. Field of the Invention

The present invention relates to automobile sunvisors of the type which are pivotally mounted above the windshield of the car to shade the eyes of the driver and passenger from the sun.

2. Description of the Prior Art

Prior art sunvisors consist of a single panel which can be hinged to a position in which some of the rays of the sun are prevented from reaching the eyes of the driver and passenger. In many instances the early morning and late evening sun reaches a low angle not intercepted by prior art sunvisors.

SUMMARY OF THE INVENTION

The present invention relates to attachments in the form of extenders for conventional sunvisors with the extender having the form of a sleeve in one form of the invention which can be adjusted both vertically and from side to side on the sunvisor to extend the effective area of the sunvisor in order to intercept the rays of the sun and prevent them from reaching the eyes of the driver or passenger. Another form of the invention involves the use of a single extender panel secured to the regular sunvisor by a spring clip mounted on the regular sunvisor. A third form of the invention consists of a single panel extender having a spring clip secured thereto which in turn encompasses the sunvisor to secure the extender to the sunvisor for adjustment thereon. In retracted position each of the sunvisor extenders occupy only slightly more area than the sunvisor and permit the sunvisor to be used in a conventional manner when the sunrays are not in a position in which the extender would be required.

The primary object of the invention is to provide a sunvisor extender which can be quickly and easily attached to the sunvisor and which also can be quickly and easily adjusted to intercept the sunrays to prevent them from reaching the eyes of the driver or passenger.

Other objects and advantages will become apparent in the following specification when considered in light of the attached drawings.

DESCRIPTION OF THE PREFERRED EMBODIMENT

Figures 1, 3:
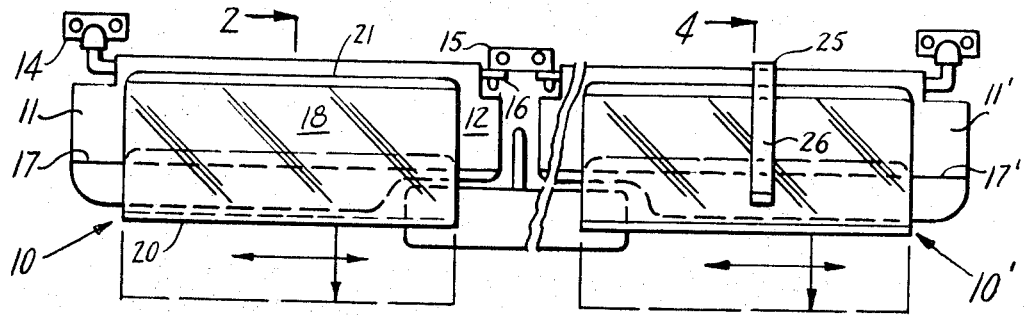
FIG. 1 is an elevational view of one form of the invention.
FIG. 3 is an elevation view of another form of the invention.

Referring now to the drawings in detail wherein like reference characters indicate like parts throughout the several figures the reference numeral 10 indicates generally an extender for sunvisors constructed in accordance with the invention.

The sunvisor extender 10 is used with a conventional sunvisor 11 having a pair of parallel-opposed faces 12, 13 and supported on a bracket 14 secured to the vehicle. A second bracket 15 supports the opposite end of a shaft 16 which extends transversely from the bracket 14. The shaft 16 is embedded in the upper edge of the sunvisor 11 all in a conventional manner.

The sunvisor 11 has a transverse lip 17 formed on each of the surfaces 12, 13.

The extender 10 is formed of a generally U-shaped sleeve having a generally rectangular panel 18, a second generally rectangular panel 19 positioned in opposed relation thereto and connected by an integral bight 20. The extender 10 is formed of suitable metal or plastic and the rectangular panels 18, 19 are spring-tensioned toward each other by the bight 20 so as to firmly grip the sunvisor 11 lying therebetween. A lip 21 is formed on the transverse edge of the panel 18 opposite the bight 20 and a second lip 22 is formed on the transverse edge of the panel 19 opposite the bight 20 to permit the extender 10 to be easily slipped over the lower edge of the sunvisor 11. The panel 18 is also provided with an internal shoulder 23 extending transversely thereacross adjacent the lip 21 and the panel 19 is provided with a similar internal shoulder 24 adjacent the lip 22 and extending parallel thereto. The shoulders 23, 24 are adapted to engage the lips 17 upon outward movement of the extender 10 on the sunvisor 11 to prevent the extender 10 from becoming dislodged from the sunvisor 11.

Figure 2:
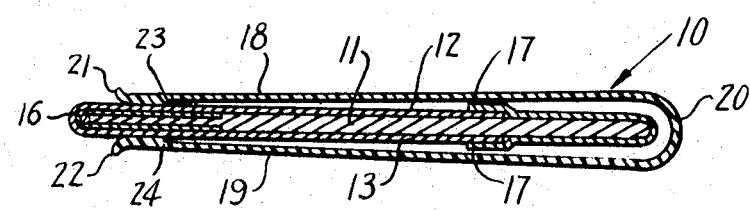
FIG. 2 is an enlarged vertical cross section taken along the line 2—2 of FIG. 1 looking in the direction of the arrows.

In the use and operation of the invention the extender is slipped onto the sunvisor from the lower edge thereof by pressing the lips 21, 22 thereover. The extender 10 is then pushed further upwardly on the sunvisor 11 to a position as illustrated in FIG. 2 where it will normally rest. When it is desired to extend the sunvisor in any direction the extender 10 is moved either vertically or sidewise on the sunvisor 11 until the rays of the sun reaching the driver's or passenger's eyes are intercepted.

Figure 4:
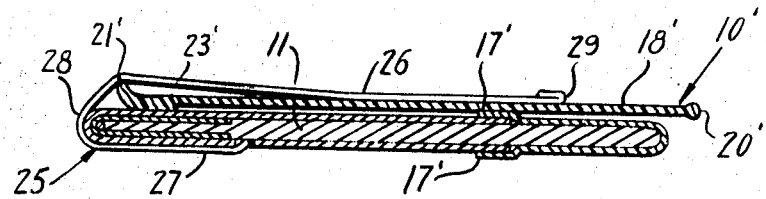
FIG. 4 is an enlarged vertical sectional view taken along the line 4—4 of FIG. 3 looking in the direction of the arrows.

Referring now to FIGS. 3 and 4 a modified form of sunvisor extender is illustrated generally at 10'.

The extender 10' is used with a sunvisor 11' identical to the sunvisor 11 and includes the transversely extending lips 17'. The extender 10' consists of a generally rectangular panel 18' having a terminal outer edge 20' and a lip 21' formed on its inner edge. A shoulder 23' extends transversely across the inner face of the rectangular panel 18' for cooperation with the lip 17' in a manner to be described. A spring clamp 25 includes a relatively long arm 26, a relatively short arm 27 and a connecting bight 28 integrally connecting the arm 26 and the arm 27 while spring biasing the arm 26 toward the arm 27. The arm 26 is reverted at 29 to prevent the arm 26 from digging into the panel 18'.

In the use and operation of the modification illustrated in FIGS. 3 and 4 the extender 10' is moved in exactly the same way as the extender 10 described above to accomplish the same purpose with the shoulder 23' engaging the lip 17' to prevent the panel 18' from becoming dislodged from the sunvisor 11'. The spring clip 25 engages about the upper edge portion of the sunvisor 11' with the long arm 26 thereof extending down and over the panel 18'.

Figure 6:
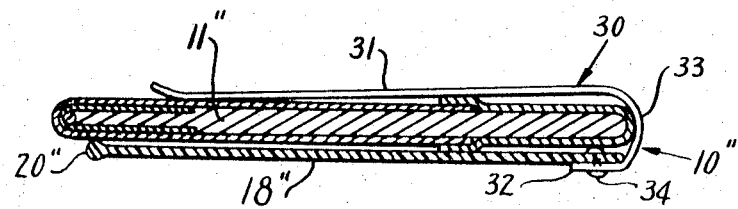
FIG. 6 is an enlarged sectional view taken along the line 6—6 of FIG. 5 looking in the direction of the arrows.
Figure 5:
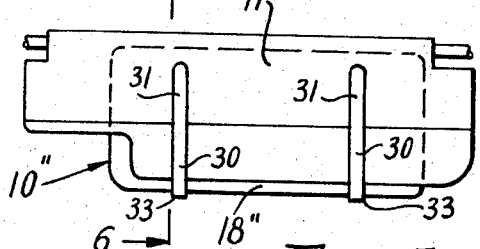
FIG. 5 is an elevational view of still another form of the invention.

Referring now to FIGS. 5 and 6 a modified form of the sunvisor extender 10" is illustrated.

The extender 10" is used with a sunvisor 11" identical in all respects to the sunvisor 11 described above. The extender 10" includes a generally rectangular panel 18" having a rounded nose 20" on the free end thereof. A spring clip 30 is provided with a long arm 31, a short arm 32 and a bight 33 integrally connecting the arm 31 to the arm 32. The bight 33 provides spring tension normally urging the arm 31 toward the arm 32. The short arm 32 is riveted at 34 to the end edge of the panel 18' opposite the nose 20' to secure the spring clip 30 thereto.

The extender 10" is used in the identical manner as the extenders 10 and 10' being moveable both vertically and sidewise. As can be seen in FIG. 5 a pair of the spring clips 30 are secured to the panel 18" to give a stable support thereto.

Having thus described the preferred embodiments of the invention it should be understood that numerous structural modifications and adaptations, in addition to those shown may be resorted to without departing from the spirit of the invention.

What is claimed is:

1. A sunvisor extender comprising a generally rectangular panel, spring means on said panel for attaching said panel to a sunvisor for sliding vertical and sidewise adjustable movement thereon, an internal shoulder on said panel adjacent the free edges thereof for cooperation with an external shoulder on said sunvisor for limiting the vertical sliding movement of said panel on said sunvisor in one direction.

2. A device as claimed in claim 1 wherein a pair of said panels are arranged in opposed relation and the spring means for securing the said panels to said sunvisor comprises an integral spring bight connecting said panels.

3. A device as claimed in claim 1 wherein the spring means securing said panel to said sunvisor comprises a generally U-shaped clip having a relatively short arm and a relatively long arm fixedly connected to said sunvisor and supporting said panel for sliding movement with respect thereto.

4. A device as claimed in claim 1 wherein the spring means for securing said panel to said sunvisor includes a generally U-shaped spring clip having a relatively long arm and a relatively short arm with said short arm rigidly connected to said panel and said long arm slidably connected to said sunvisor.

* * * * *